July 1, 1969  R. F. SMITH  3,452,843
ROTARY IMPELLER AND REINFORCING MEANS THEREFOR
Filed Aug. 18, 1967
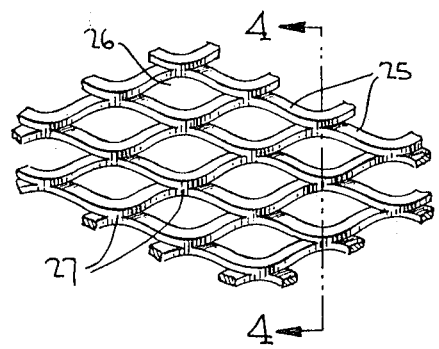
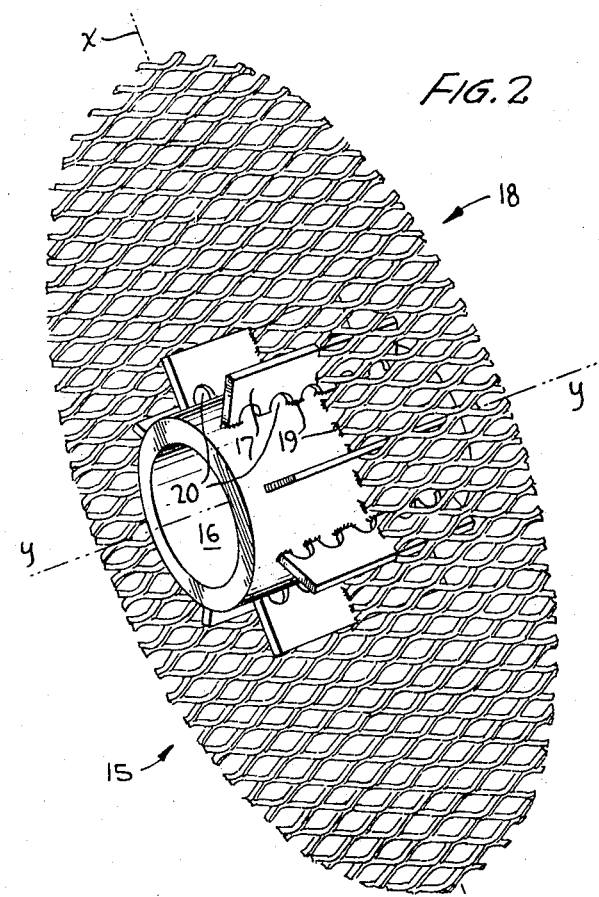
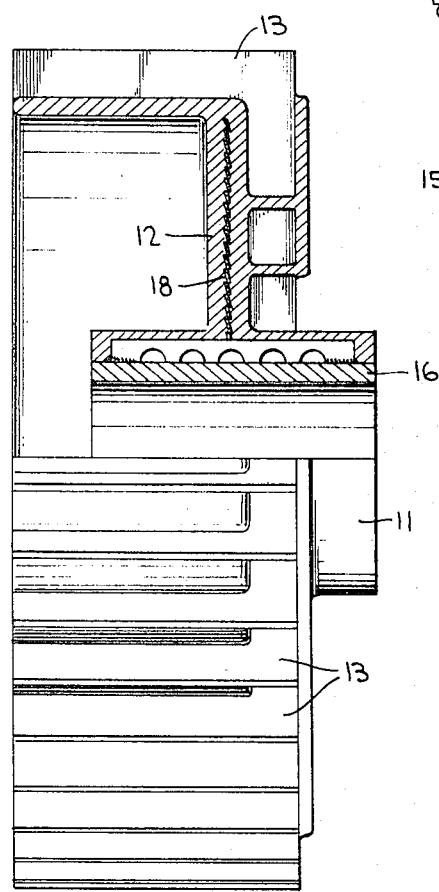
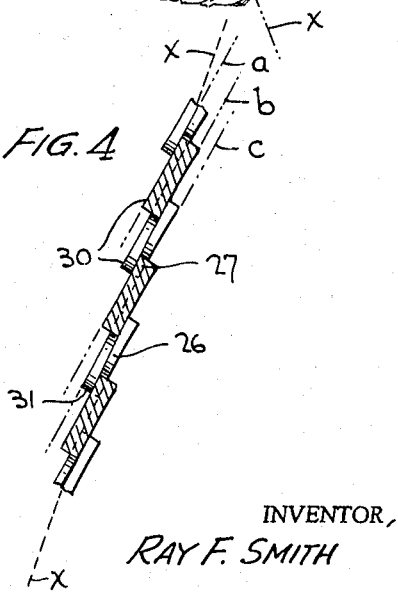
INVENTOR,
RAY F. SMITH
BY Watson, Cole, Grindle & Watson
ATTORNEYS

United States Patent Office 3,452,843
Patented July 1, 1969

3,452,843
ROTARY IMPELLER AND REINFORCING MEANS THEREFOR
Ray F. Smith, Berwick, Pa., assignor to Berwick Forge and Fabricating Corp., Berwick, Pa., a corporation of Pennsylvania
Filed Aug. 18, 1967, Ser. No. 661,645
Int. Cl. F16d 65/10, 57/00; F04d 29/18
U.S. Cl. 188—218    8 Claims

ABSTRACT OF THE DISCLOSURE

A cast metal impeller having expanded metal reinforcement for the disc-like annular body and with a sleeve and reinforcement plates for the hub. The cross strips of the expanded metal are capable of longitudinal bending and torsional flexure to accommodate wide temperature changes and large mechanical stresses. The interstices between the cross strips are of enlarged diamond shape and planes passing through the interstices of said expanded metal are different to resist separation of the cast body.

---

The present invention relates to construction of cast mechanical elements and, more particularly, to an improved rotary impeller having a cast body with an integral reinforcement.

In the art of hydrodynamic couplings, it has heretofore been known to form the impellers and the stator members by casting of the same without incorporation of any type of reinforcement. This has proven to be generally successful in making reliable parts for fluid transmissions, and for other hydrodynamic systems wherein the temperature changes and mechanical stresses do not vary over a wide range.

On the other hand, the construction of strong, lightweight and reliable parts for hydrodynamic brakes or retarders has presented problems. To explain briefly, in a hydrodynamic brake there is provided a rotating impeller which cooperates with an outer stator housing to retard the movement of a vehicle by converting kinetic energy into heat energy by causing turbulence and shearing of the oil in the brake. The rotating impeller of such a system must be capable of withstanding a large centrifugal force as well as the rather large torsional and vibrational stresses due to the hydraulic turbulence generated when the brake is loaded. Also, this part must be capable of undergoing wide temperature changes and the attendant expansions and contractions which are caused by the heat generated by shearing of the oil between the impeller and stator pockets when the brake is activated and each subsequent cool down period. For a more complete description of this type of brake or retarder to which the present invention relates, reference may be made to my copending application entitled, "Hydrodynamic Retarder," Ser. No. 613,355, filed Feb. 1, 1967, and assigned to the same assignee as the present invention.

Other considerations in the development of an efficient impeller for a hydrodynamic brake or retarder are that it must be of lightweight construction to eliminate undue flywheel effect and must have a relatively large diameter so as to have a large effective lever arm to increase the retarding efficiency and torque absorption properties. With these considerations in mind and in view of the above mentioned inherent problems of wide temperature changes and large mechanical stresses, it is one object of the present invention to provide a design for an improved reinforced casting particularly suitable for an impeller of a hydrodynamic brake.

It is another object of the present invention to provide an improved reinforced metal casting which takes into account the desirable design considerations of lightweightness, strength and relatively large diametral dimension.

It is another object of the present invention to provide a metal casting of a generally disc-like shape that utilizes a network of expanded metal embedded in said body for reinforcement, said expanded metal preferably having offset nonplanar faces to resist separation by centrifugal and other mechanical forces.

It is still another object of the present invention to provide a rotary impeller for a hydrodynamic brake having a reinforced spider assembly embedded therein, which greatly strengthens the hub and the annular disc-like body of said impeller while at the same time accommodating the attendant temperature changes and mechanical stresses of a hydrodynamic brake.

Accordingly, to consider the device of the present invention briefly, there is provided a rotary impeller which has a reinforcing network of what is known in the art as expanded metal extending radially outward from the hub of the impeller to reinforce the annular body thereof. In general, expanded metal may be described as being formed of a plurality of integrally connected elongated cross strips with diamond shaped interstices formed therebetween. During manufacture, it is formed by providing a plurality of slits in a solid sheet of steel and then expanding the same outwardly to form the interstices by enlarging the slits. Such expanded metal can be obtained from steel fabricating concerns, such as Joseph T. Ryerson & Son, Inc. of Chicago, Illinois.

As is well known, expanded metal is more rigid than an equal weight of solid steel plate, perforated metal, or wire mesh and I have discovered that it is particularly adaptable to use for renforcing metal castings which are subject to wide temperature changes and large mechanical stresses. This is thought to result from the fact that even though such a network is rigid for giving the necessary reinforcement, it is at the same time capable of expanding and contracting by longitudinal bending of said strips. Also, when utilizing the type of expanded metal wherein planes passing through the interstices are different, that is not lying in the same plane, the offset nonplanar faces provided thereby provide greatly improved resistance to separation of the body from centrifugal force and the mechanical stresses. Also, in this instance, the cross strips are subject to torsional flexure when the casting is stressed to further insure against rupture. Furthermore, the diamond shaped interstices increase the strength of the connecting portions of the cast body over that which might otherwise be provided by other configurations, such as circular.

The rotary impeller of the present invention is further strengthened by providing a reinforcing sleeve in the hub of the impeller with a plurality of elongated hub reinforcement plates spaced around the outer periphery of said sleeve and embedded within the cast part. Each of the plates has a series of aligned apertures which allow the formation of connecting cast rings within the hub. The combination of the sleeve, elongated plates, and expanded metal network are welded together to form a spider assembly, which, when incorporated into the cast impeller, provides an unusual combination of lightweightness, strength and rigidity of a large diameter part which has heretofore not been possible.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIGURE 1 is a side view of a rotary impeller constructed in accordance with the present invention with a portion thereof in cross section to illustrate the relationship of the reinforcing spider assembly;

FIGURE 2 is a perspective view of a fabricated spider assembly constructed in accordance with the present invention;

FIGURE 3 is an enlarged perspective view of one form of expanded metal which can be utilized with the device of the present invention; and FIGURE 4 is an enlarged cross-sectional view taken along line 4—4 of FIGURE 3.

To more specifically explain the apparatus of the present invention, reference is made first to FIGURE 1 of the drawings, wherein is shown a rotary impeller 10 for a hydrodynamic brake of the type disclosed in my aforementioned application. The impeller 10 is constructed of cast aluminum or aluminum base alloy for lightweightness and comprises a hub 11, an annular disc-like body 12 extending radially outward from approximately the midpoint of said hub 11, and a series of radially extending blades 13 extending along one face of said annular body 12 and radially outwardly therefrom. In use, the impeller 10 is rotatably mounted on a rotating shaft (not shown) within a circular housing (also, not shown) having stator blades positioned in opposed relationship to the blades 13. The housing is filled with oil and the rotating impeller 10 is braked by the shearing and turbulence of the oil between the pockets formed by said blades. Under these conditions, it will be realized that the hub 11 and the annular body 12 are subjected to wide temperature changes due to intermittent heating and cooling when the system is loaded and unloaded, respectively, and to large mechanical stresses when the system is loaded due to the back and forth movement of the oil between the pockets. Thus, the impeller 10 forms an excellent example of a body which may be reinforced in the advantageous manner in accordance with the teachings of the present invention. However, in accordance with the broader aspects of the present invention, it is to be understood that other similar metal castings, such as brake drums and the like, could be beneficially made in accordance with these teachings, if desired.

With reference to FIGURE 2 of the drawings, a reinforcing spider assembly 15 particularly adapted for use in the impeller 10 of FIGURE 1 is shown for the purpose of describing the invention. Specifically, the spider assembly 15 comprises a tubular sleeve 16, a plurality of elongated plates 17 extending radially outward from said sleeve 16 and being substantially equally spaced along the periphery, and a network of expanded metal 18 encircling and incorporating said sleeve 16 and said plates 17 in the manner shown. These several parts, that is the sleeve 16, the plate 17 and the network 18, are suitably welded at their junctures, as indicated for example by the reference numeral 19 in FIGURE 2, so as to form a composite substantially rigid reinforcement for said impeller 10 to be embedded therein upon casting in the manner shown in FIGURE 1.

All of the parts of the spider assembly 15 are preferably of ferrous metal or steel for strength and rigidity. In order to be able to be securely bonded to the cast aluminum body, said assembly 15 is preferably preroughened on its entire surface by sand blasting or other conventional processes. As shown in FIGURE 1, the steel sleeve 16 forms a hard metal core of the complete impeller 10 so that the same may be securely fastened to the shaft (not shown) which is to be braked by action of said impeller 10 without being subject to rupture of the soft aluminum metal. The plates 17 have semicircular apertures 20 so that connecting cast rings are formed in the hub 11 around and in juxtaposition to the sleeve 16. Also, since the reinforcement parts are welded together and are thus a fabricated entity, all mechanical forces and stresses are distributed more evenly from the hub 11 outwardly along the annular body 12 by the network 18. Thus, the ability of the casting to transmit large amounts of torque to the blades 13 at the outer periphery of the body 12 is greatly enhanced.

Although it is to be understood that broadly speaking any form of expanded metal may be utilized to form the network 18, preferably the construction shown in FIGURE 3 is utilized for this reinforcing purpose. As can be seen in this enlarged view, the network 18 is made up of a series of elongated cross strips 25 with diamond shaped interstices 26 and integral joints 27 being formed therebetween. The cross strips 25 are subject to forces extending in all radial directions from the sleeve 16 and these forces in general act to cause longitudinal bending of the cross strips 25 in both the up-and-down and cross directions with respect to the network 18, as noted in FIGURE 2 by x and y axes, respectively. This means that the network can expand and contract in all directions as necessary due to temperature changes and also flex in all directions to a limited degree, as a result of mechanical forces. As will be realized, when the network 18 is embedded in the annular body 12 of the impeller 10, connecting portions of aluminum will be provided through said interstices 26 and this ability of the cross strips 25 to bend is thus also important to compensate for the differences in expansion coefficients of the juxtaposed diverse metals, that is, aluminum and steel. Because of the diamond shaped configuration and enlarged cross-sectional area of the connecting portions, the resistance to separation of the cast body 12 in the short axial direction or through the thickness is of superior quality.

The adjacent cross strips 25 are preferably offset with respect to each other so that planes a, b, c passing through the interstices 26 are different or nonplanar, which provides a plurality of nonplanar faces designated by the reference numeral 30 (see FIGURE 4). These faces 30 tend to give the impeller 10 added strength by resisting radial separation of the body 12 from the network 18 due to centrifugal force. This action is, of course, effective along both the x and y axes, as designated in FIGURE 2, since along both axes there are provided edges 31 (FIGURE 4) of the strips 25 in addition to the faces 30 that all together afford a plurality of positive abutting surfaces against which the cast aluminum may act to resist the outwardly directed centrifugal force. Furthermore, in the preferred embodiment with the cross strips 25 offset in the manner shown, the expansion and contraction of the network 18 will necessarily cause a torsional flexure in the cross strips 25 between the joints 27. For example, when forces are present along the x axis (FIGURES 2 and 4), the cross strips 25 will not only be subjected to bending but will also be subjected to a torsional force tending to straighten out the network 18 with its offset configuration of the planes a, b, c. This additional flexure of the network 18 is desirable to further insure that expansion and contraction and the mechanical stresses can be absorbed without destruction of the casting or separation of the casting from the network 18. Most importantly, this torsional flexure in the expanded metal network 18 acts in concert with the bending flexure to compensate for relative differences of expansion and contraction between the aluminum metal of the casting and the ferrous metal or steel of the spider assembly 15. This multi-axis distortion or flexure of the steel network 18 is allowed within the cast body 12 by compression and relaxation of the relatively soft aluminum metal without breakage or separation.

Accordingly, in summary, it will be realized that the unusually large and varied forces which work within the cast impeller 10 during operation will be advantageously accommodated by incorporation of the reinforcement spider assembly 15. Of great importance is the use of the network 18 of expanded metal which has been found to have the desired properties of rigidity and strength while at the same time being capable of multiple axis flexure so as to accommodate temperature changes and stresses occurring in the body 12. The use of expanded metal with different planes a, b, c, through the interstices 26 gives the additional advantage of resisting separation of the body by the rather large centrifugal forces which are present in an operating part of this type.

In this disclosure, there is shown and described only the preferred embodiment of the invention, but, as aforementioned, it is to be understood that the invention is capable of various changes or modifications within the scope of the inventive concept as expressed by the accompanying claims.

I claim:

1. In a rotary impeller for use in a hydrodynamic system, wherein said impeller includes an integral metal casting with a hub, an annular disc-like body, and a plurality of radially extending vanes, said impeller to be subjected to wide temperature changes and large torsional and centrifugal stresses between said hub and said vanes, the improvement comprising a reinforcement embedded in said annular body including a network of expanded metal in said annular body, said network having a plurality of integrally connected cross strips with interstices forced between the same, said body including connecting portions extending through said interstices, whereby said network is capable of expanding and contracting with said body by longitudinal bending of said strips to accommodate said temperature changes and said stresses, an elongated reinforcing sleeve integrally attached to the center of said network and encircled by said casting so as to form the interior of said hub whereby a continuous reinforced path is provided for the torsional and centrifugal stresses being transmitted between said sleeve and said vanes through said annular body.

2. The combination of claim 1 wherein planes passing through said interstices are different whereby said network is also capable of expanding and contracting with said body by torsional flexure of said strips, and whereby offset nonplanar faces are provided to resist separation of said annular body.

3. The combination of claim 1 wherein said interstices are substantially diamond shaped to increase the strength of said connecting portions.

4. The combination of claim 1 wherein is further provided a plurality of elongated hub reinforcement plates extending axially along said sleeve, said plates being spaced substantially equidistantly around the outer periphery of said sleeve and being embedded within said hub, each of said plates having a series of apertures therein to allow the formation of connecting cast rings in said hub.

5. A reinforcing spider assembly for embedding in a metal disc-like cast body having an integral hub, said assembly to be subjected to wide temperature changes and large torsional and centrifugal stresses between said hub and said body comprising an elongated reinforcing sleeve for said hub, and a network of expanded metal having a plurality of integrally connected elongated cross strips with interstices formed therebetween for reinforcing said body, the center of said network being integrally attached to said sleeve to provide a continuous reinforced path between said sleeve and said body for said stresses, said network being capable of expanding and contracting by bending of said cross strips to accommodate said temperature changes and said stresses.

6. The combination of claim 5 wherein planes passing through said interstices are different whereby said network is also capable of expanding and contracting with said body by torsional flexure of said strips, and whereby offset nonplanar faces are provided to resist separation of said annular body.

7. The combination of claim 5 wherein is further provided a plurality of elongated plates extending axially along said sleeve, said plates being spaced substantially equidistantly around the outer periphery of said sleeve and interlocked with said network for further reinforcing said hub.

8. The combination of claim 7 wherein each of said plates has a series of apertures therein, said apertures being formed in part by the outer surface of said sleeve to allow the formation of connecting cast rings in said casting in juxtaposition to said sleeve.

References Cited

UNITED STATES PATENTS

| 587,493 | 8/1897 | Sargent. |
| 2,519,473 | 8/1950 | Lack et al. |
| 3,016,269 | 1/1962 | Lorean _____ 188—218 X |
| 3,095,820 | 7/1963 | Sanborn et al. |
| 1,323,533 | 12/1919 | Hurt. |

FOREIGN PATENTS

| 217,599 | 7/1924 | Great Britain. |
| 905,473 | 9/1962 | Great Britain. |

GEORGE E. A. HALVOSA, *Primary Examiner.*

U.S. Cl. X.R.

103—115; 164—108; 188—90; 295—8, 21